(12) United States Patent
Gschwantner et al.

(10) Patent No.: US 6,593,971 B1
(45) Date of Patent: Jul. 15, 2003

(54) RECEIVING DEVICE FOR RECEIVING TELETEX INFORMATION, HAVING MEANS FOR AUTONOMOUSLY DETERMINING AN APPROPRIATE CHARACTER SET

(75) Inventors: Günter Gschwantner, Krems/Donau (AT); Ewald Römisch, Vienna (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/548,733

(22) Filed: Apr. 13, 2000

(30) Foreign Application Priority Data

Apr. 14, 1999 (EP) .............................. 99890123

(51) Int. Cl.$^7$ .......................... H04N 11/00; H04N 7/00
(52) U.S. Cl. ...................... 348/468; 348/465; 348/473; 348/478
(58) Field of Search ................ 348/468, 473, 348/476, 477, 478, 465, 564, 725, 705, 906; H04N 11/00, 7/00, 7/08, 7/084, 7/087

(56) References Cited

U.S. PATENT DOCUMENTS

| | | | | |
|---|---|---|---|---|
| 5,650,826 A | * | 7/1997 | Eitz ............................ | 348/468 |
| 6,111,612 A | * | 8/2000 | Ozkan et al. ............... | 348/465 |
| 6,335,763 B1 | * | 1/2002 | Nishio et al. ............... | 348/564 |
| 6,389,271 B1 | * | 5/2002 | Kaneko ....................... | 348/725 |
| 6,400,408 B1 | * | 6/2002 | Berger ........................ | 348/465 |
| 6,430,357 B1 | * | 8/2002 | Orr ............................. | 348/460 |

OTHER PUBLICATIONS

Research Disclosure # 36853, Dec. 1994.

* cited by examiner

Primary Examiner—John Miller
Assistant Examiner—Trang U. Tran (57) ABSTRACT

In a receiving device (17) for receiving a television signal (FS2, FS3) which contains character codes (CC) and additional information (CI, NI, UCSI) in VBI lines, having character set storage means (22) for the storage of character codes (CC) and associated reproducible character information (CHI) of a character set and a plurality of character sub-sets, and having VBI read-out means (27) for reading out character codes (CC) and additional information (CI, NI, UCSI) contained in VBI lines of a received television signal (FS2, FS3), and having detection means (20) for the detection of character sub-set information (UCSI) contained in read-out additional information (CI, NI, UCSI), which character sub-set information identifies the character sub-set to be used for the decoding of read-out character codes (CC), and having display signal generating means (21) adapted to generate a display signal (AS) which contains reproducible character information (CHI), taking into account received character sub-set information (UCSI), the character set storage means (22) are now adapted to store character codes (CC) and associated reproducible character information (CHI) of at least two character sets and a plurality of character sub-sets of each character set, and the detection means (20) are, in addition, adapted to detect program source information (NI) or country information (CI) contained in read-out additional information (CI, NI, UCSI) and to supply character set information (CSI) which identifies the character set to be used for the decoding of read-out character codes (CC).

20 Claims, 5 Drawing Sheets

RECEIVING DEVICE FOR RECEIVING TELETEX INFORMATION, HAVING MEANS FOR AUTONOMOUSLY DETERMINING AN APPROPRIATE CHARACTER SET

BACKGROUND OF THE INVENTION

The invention relates to a receiving device as defined in the opening part of claim 1, to a recording device as defined in the opening part of claim 8, and to a television set as defined in the opening part of claim 9.

Such a receiving device as defined in the opening part of claim 1 is known from the document "Research Disclosure 36853, December 1994" and takes the form of a teletext decoder. The known teletext decoder has character set storage means in which character codes and associated character information of a character set for countries of the Central European region are stored. In order to deal with national differences of the character sets of European countries the character set storage means store eight character sub-sets of the character set for Central Europe, which each comprise a given number of country-specific characters. There are, for example, country-specific character sub-sets for the language French or Swedish, which each define a number of 13 character data within the character set.

Teletext information and VPS information, which include character codes and additional information can be transmitted in hidden lines of a television signal, so-called VBI lines (Vertical Blanking Information). The teletext specification (ETS 300 706) specifies that a header row of each teletext page contains three control bits (National Option Character Sub-Set Bit: C12, C13, C14) which form character sub-set information and which specify the appropriate character sub-set of the character set for character codes of this teletext page.

The known teletext decoder includes VBI read-out means which read out the teletext information of a teletext side selected by a user and store this information in page storage means. Detection means of the teletext decoder inter alia detect also the three control bits of the header row of the stored teletext information in order to define the appropriate character sub-set for the decoding of the character codes of the teletext information.

Subsequently, display signal generating means of the teletext decoder are adapted to decode the character codes contained in the stored teletext information. The display signal generating means derive reproducible character information from the appropriate character sub-set for each character code contained in the stored teletext information and supply said character information as a display signal. The display signal can be applied to a monitor and the character information can be displayed as teletext information text by means of the monitor.

It has proved to be a disadvantage of the known teletext decoder that the character set storage means of the teletext decoder store only one character set which cannot be used for the decoding of character codes of television signals of other regions, such as for example the Arab countries, Russia or Greece.

SUMMARY OF THE INVENTION

It is an object of the invention to provide a receiving device by means of which character codes received in teletext information and relating to at least two regions can be decoded. This object is achieved in a receiving device by the measures defined in the characterizing part of claim 1.

Thus, it is achieved that at least two character sets for two different regions are stored in the character set storage means. In order to select the appropriate character set for the decoding of character codes contained in teletext information, the detection means are adapted to detect program source information or country information. The TV station which transmits the television signal containing the received teletext information is identified by program source information transmitted as additional information in VBI lines. Country information transmitted as additional information in VBI lines identifies the country where the television signal containing the received teletext information is transmitted.

This yields the advantage that receiving devices in accordance with the invention can be incorporated in, for example, television sets, video recorders or combination apparatuses, which can be sold and used in a plurality of different regions. Advantageously, such apparatuses are adapted to display teletext information with the appropriate character set, which information may be contained in television signals which can be received, for example via satellite, in a plurality of different regions.

The measures defined in claim 2 yield the advantage that in the table storage stage each item of program source information or country information is stored in correlation with character set information which designates an appropriate character set stored in the character set storage means.

The measures defined in claim 3 and claim 4 yield the advantage that an appropriate character set can be selected even in the absence of program source information and country information in additional information read out of VBI lines.

The measures defined in claim 5 yield the advantage that program source information and country information laid down in the VPS standard and the teletext standard can be read and detected and that no new additional information must be transmitted in VBI lines.

In accordance with the measures defined in claim 6 a character set, a twisted character set and up to eight character sub-sets can be stored for each region. The teletext specification defines a change-over between the appropriate character set and the appropriate twisted character set of a region by means of additional information included in the teletext information. This yields the advantage that the character set storage means can also store twisted character sets for a plurality of regions.

The measures defined in claims 8 and 9 provide a video recorder and a television set including a recording device, which have the afore-mentioned advantages of a receiving device in accordance with the invention.

BRIEF DESCRIPTION OF THE DRAWINGS

The invention will be described in more detail hereinafter with reference to the Figures which show an embodiment given by way of example, to which the invention is not limited.

DESCRIPTION OF THE PREFERRED EMBODIMENTS

Figure 1:
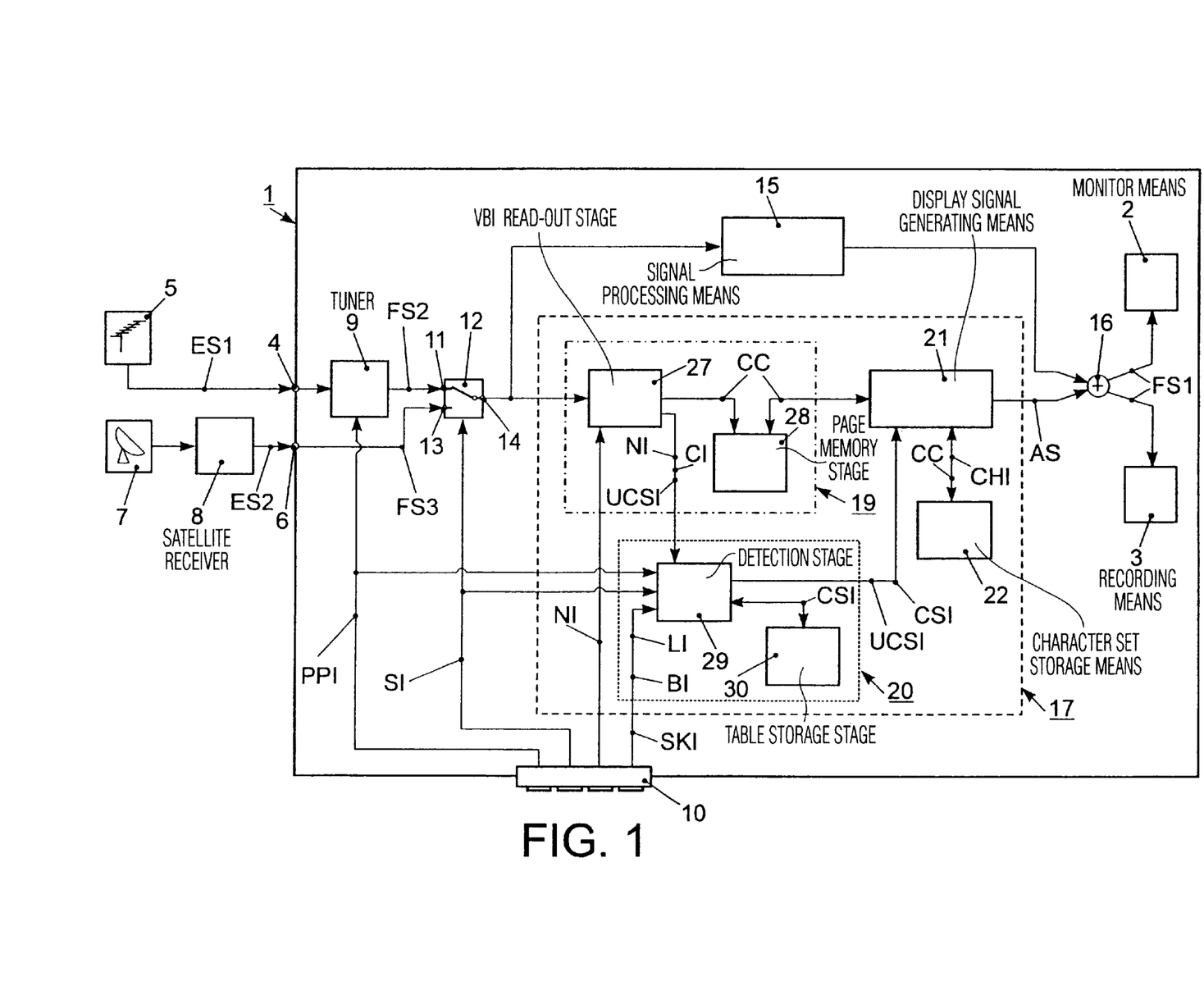
FIG. 1 shows a block diagram of a combination apparatus comprising a monitor means and recording means and including a receiving device for receiving a television signal, which television signal may include in its VBI lines character codes which can be decoded by means of at least two different character sets.

FIG. 1 shows a block diagram of a combination apparatus 1 which combines monitor means 2 and recording means 3 so as to obtain the functions of a television set and a video recorder. The monitor means 2 are adapted to reproduce picture information and sound information of a first television signal FS1. The recording means 3 is adapted to record the first television signal FS1 on a magnetic-tape cassette and, in addition, to reproduce the first television signal FS1 from the magnetic-tape cassette.

The combination apparatus 1 has a first input terminal 4 via which a first reception signal ES from a terrestrial antenna 5 can be applied to the combination apparatus 1. The combination apparatus 1 has a second input terminal 6 via which a second reception signal ES2 can be applied to the combination apparatus 1. Reception signals can be received by means of a satellite antenna 7 and can be applied to a satellite receiver 8. A reception signal processed by the satellite receiver 8 can be supplied to the second input terminal 6 as the second reception signal ES2.

Figure 8:
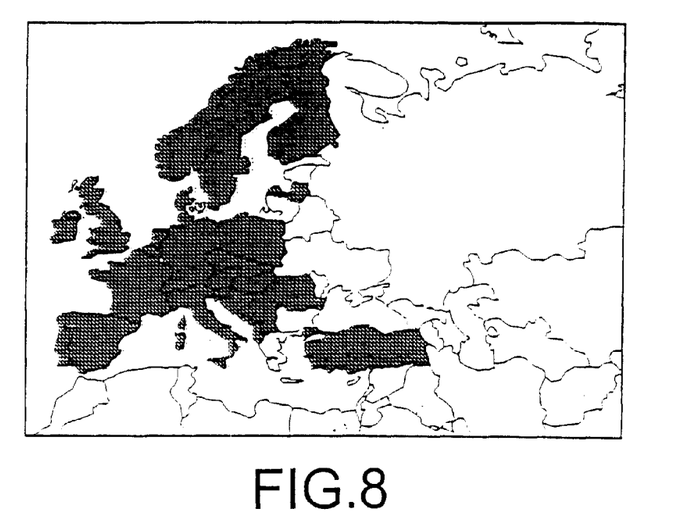
FIG. 8 shows a map on which the countries of the Central European region have been marked in gray.
Figure 9:
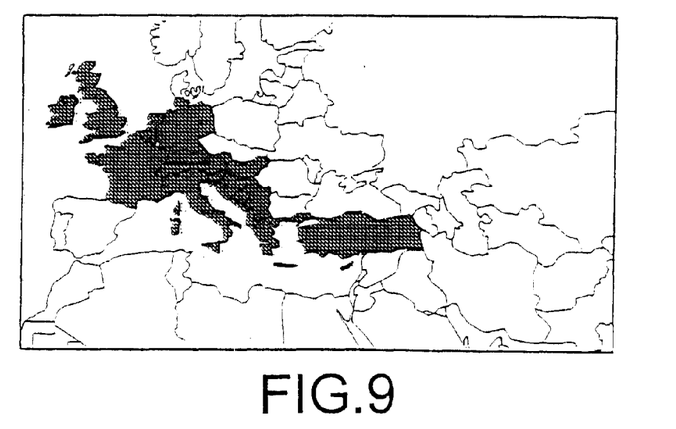
FIG. 9 shows a map on which the countries of the region Greece/Turkey have been marked in gray.
Figure 10:
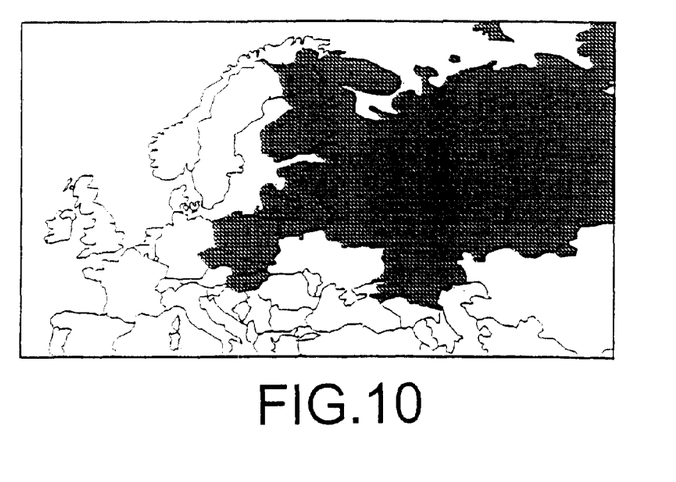
FIG. 10 shows a map on which the countries of the region around Russia have been marked in gray.

The first reception signal ES1 and the second reception signal ES2 may contain television signals FS from television stations FA in different regions of the world. FIGS. 8, 9 and 10 show maps on which countries of the Central European region, the region Greece/Turkey and the region around Russia have been marked in gray. Depending on the region from which a television signal FS is received, the teletext information contained in the television signal requires different processing, which will be considered more fully hereinafter.

The combination apparatus 1 has a tuner 9, to which the first reception signal ES1 from the first input terminal 4 can be applied. The combination apparatus 1 further has a keyboard 10 by means of which a user of the combination apparatus 1 can activate modes of operation of the combination apparatus 1 and can enter a multitude of information.

The keyboard 10 enables program position information PPI to be entered and to be applied to the tuner 9. The program position information PPI="01" designates, for example, a storage location of a memory of the tuner 9, in which memory the frequency of the television signal FS of the television station FA="ORF1" is stored. When the keyboard 10 supplies the program position information PPI="01" to the tuner 9, the television signal FS from the television station FA="ORF1" can be supplies by the tuner 9 as a second television signal FS2. A second television signal FS2 supplied by the tuner 9 can be applied to a first terminal 11 of a switch 12.

A second reception signal ES2 applied to the second input terminal 6 can be supplied to a second terminal 13 of the switch 12 as a second terminal 13. Control information SI can be supplied from the keyboard 10 to the switch 12 in order to transfer either the second television signal FS2 or the third television signal FS3 to a third terminal 14 of the switch 12.

A television signal supplied to the third terminal 14 of the switch 12 can be applied to the signal processing means 15 of the combination apparatus 1. The signal processing means 15 include a chrominance signal processing stage and a luminance signal processing stage and process a television signal applied to the means in a manner as customary in television sets and video recorders. A television signal processed by the signal processing means 15 can be applied to a superposition stage 16.

When the combination apparatus 1 has been set to a teletext mode by means of the keyboard 10 the superposition stage 16 can superpose on the television signal processed and supplied by the signal processing means 15 a display signal AS which contains reproducible character information CHI of a teletext page, which will be described more fully hereinafter. The superposition stage 16 can supply the first television signal FS1 to the monitor means 2 and to the recording means 3.

The combination apparatus 1 in the present case includes a receiving device 17 for receiving a second television signal FS2 or third television signal FS3 from the third terminal 14 of the switch 12. In accordance with a teletext specification ETS 300 706 lines of a received television signal, referred to as VBI lines, which cannot be displayed by the monitor means 2, may contain teletext information. Teletext information includes character codes CC and additional information. By means of a character set character codes CC can be decoded into character information CHI which can be displayed as text of a teletext page by the monitor means 2, as will be described more fully hereinafter.

VBI lines may contain additional information in the form of VPS information or packet 8/30 information in accordance with format 1 or format 2, as laid down in a PDC specification ETS 300 231. VPS information and packet 8/30 information inter alia include program source information NI and country information CI. Program source information NI designates a television station FA which transmits the received television signal FS whose VBI lines contain character codes CC and additional information. The country where the received television signal FS, whose VBI lines contain character codes CC and additional information, is transmitted is identified by country information CC.

Figure 3:
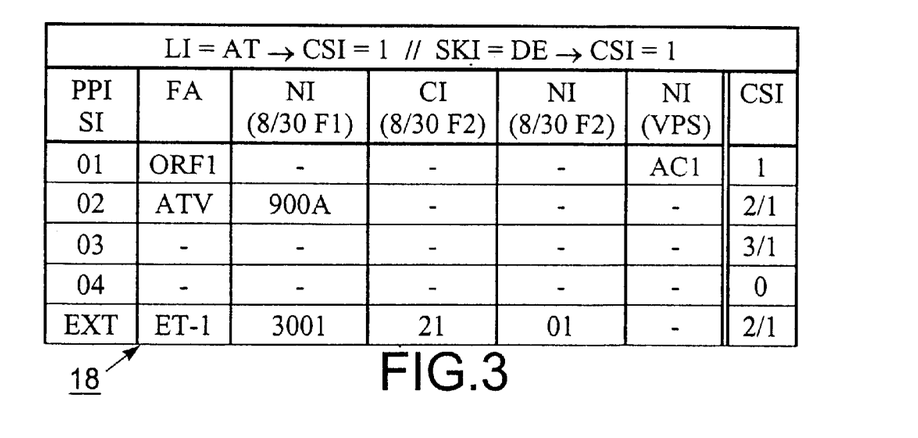
FIG. 3 shows a correlation table which can be stored in a table storage stage of the receiving device.

FIG. 3 shows a correlation table 18 which specifies program position information PPI and control information SI for the reception of a television signal FS from a television station FA. For third television signals FS3 received by the satellite antenna 7 the correlation table 18 gives as control information SI="EXT". The third column of the correlation table 18 contains packet 8/30 information in accordance with format 1 and the fourth and the fifth column of the correlation table 18 contains packet 8/30 information in accordance with format 2. A technical report TR 101 231 (V 1.1.2; 1999–03) of the European Telecommunication Standards Institute specifies which television stations FA transmit television signals FS with VPS information and/or packet 8/30 information in accordance with format 1 and/or format 2. This information is essentially contained in the correlation table 18, only a small part of the complete correlation table 18 being shown in FIG. 3.

In a set-up process for the installation of the combination apparatus 1 a user can set the country and the language of the country where the combination apparatus is used. These settings are performed, for example for the allocation of television signals from television stations to program positions of the tuner 9, the customary settings for each country being different. These settings are also used for the selection of the language in which on-screen displays are presented. The first row of the correlation table 18 can specify corresponding country information LI, which can be entered manually, and corresponding language identification information SKI, which can be entered manually.

The receiving device 17 includes VBI read-out means 19, detection means 20, display signal generating means 21, and character set storage means 22. The character set storage means 22 are adapted to store character codes CC and associated reproducible country information CHI of character sets and character sub-sets of one or more character sets.

Figure 4:
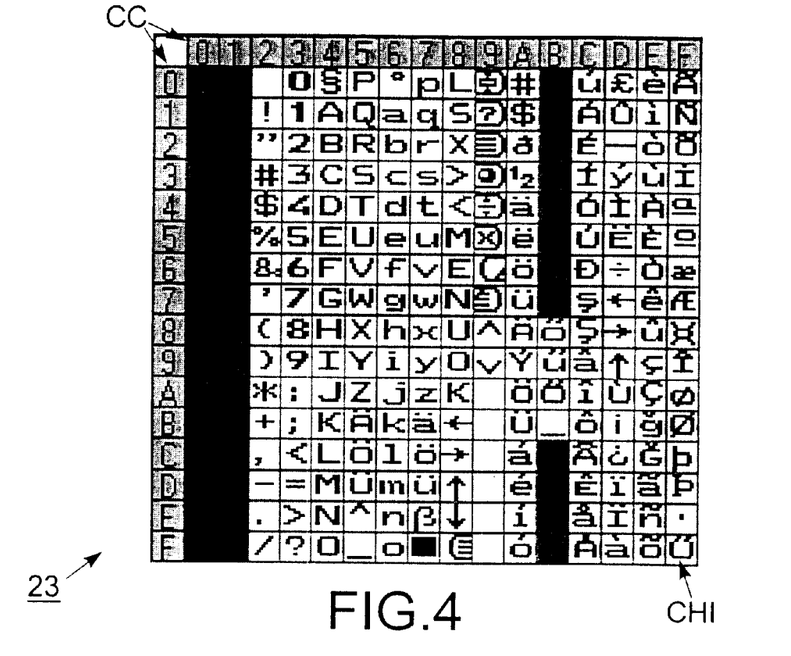
FIG. 4 shows a character set table with a first character set by means of which character codes of a television signal from the Central European region can be decoded.

FIG. 4 shows a character set table 23 with a first character set suitable for decoding character codes CC of a television signal FS from the Central European region shown in FIG. 8. A character (digit from "0" to "9" or letter from "A" to "Z" of a hexadecimal number) of the first row of the character set table 23 represents the first position of the character code CC and a character of the first column of the character set table 23 represents the second position of the character code CC of the reproducible character information CHI, the respective row and column intersecting one another. The first character set, for example, enables a character code CC="48" contained in VBI lines to be decoded into reproducible character information CHI="H".

Figure 5:
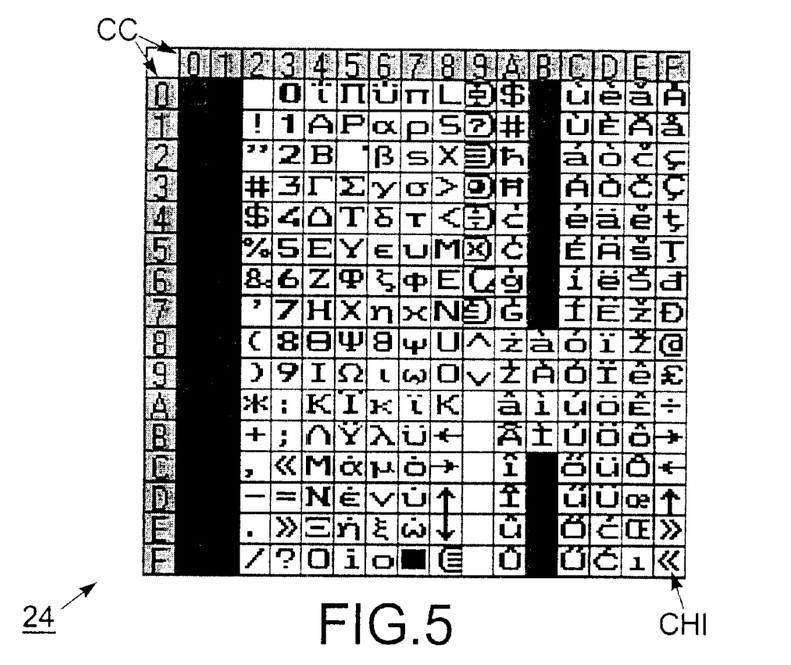
FIG. 5 shows a character set table with a second character set by means of which character codes of a television signal from the region Greece/Turkey can be decoded.
Figure 6:
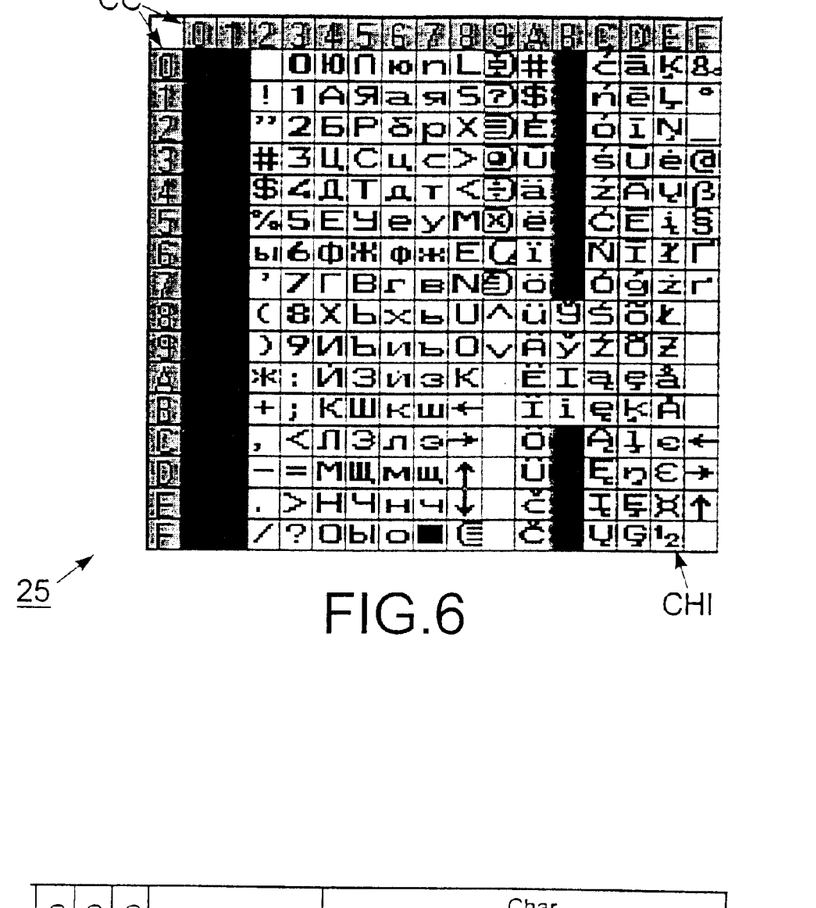
FIG. 6 shows a character set table with a third character set of Cyrillic characters, by means of which character codes of a television signal from the region around Russia can be decoded.

FIG. 5 shows a character set table 24 with a second character set suitable for decoding character codes CC of a television signal FS from the region Greece/Turkey shown in FIG. 9. FIG. 6 shows a character set table 25 with a third character set of Cyrillic characters, which is suitable for the decoding of character codes CC of a television signal FS from the region around Russia shown in FIG. 10.

The teletext specification ETS 300 706 further specifies that a header row of each teletext page contains three control bits (National Option Character Sub-Set Bit: C12, C13, C14) which form character sub-set information UCSI and which designate one of eight possible character sub-sets of the character set which are suitable for character codes CC of this teletext page. By means of a character sub-set it is possible to adapt character information CHI of a character set to country-specific attributes of the characters of the respective country.

Figure 7:
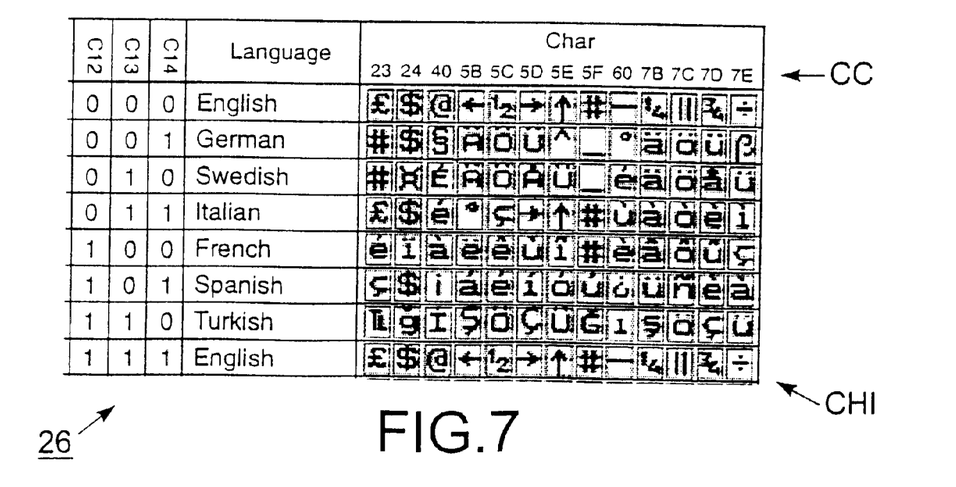
FIG. 7 shows a character sub-set table with eight different character sub-sets of the first character set.

FIG. 7 shows a character sub-set table 26 which contains eight character sub-sets of the first character set, shown in FIG. 4, for the Central European region. The first row of the character sub-set table 26 gives the character codes CC to which different character information CHI is allocated in dependence on the control bits (C12, C13, C14) supplied by the television station FA.

The teletext specification ETS 300 706 further specifies that twist information may be transmitted as additional information in VBI lines. When twist information occurs in a VBI line this denotes that a twist character set associated with a character set has been defined as a suitable character set by the television station FA. From the occurrence of twist information until the next occurrence of twist information character codes CC contained in VBI lines should be decoded by means of the twist character set. The character set storage means 22 store the first character set as a twist character set for the second and the third character set.

The VBI read-out means 19 comprise a VBI read-out stage 27 and a page memory stage 28. A second television signal FS2 or a third television signal FS3 received from the third terminal 14 of the switch 12 can be applied to the VBI read-out stage 27. Furthermore, number information NI can be supplied from the keyboard 10 to the VBI readout stage 27. When the combination apparatus 1 has been set to the teletext mode a user can enter the page number of a teletext page by means of the keyboard 10 to display the teletext information of this page by means of the monitor means 2. Number information NI corresponding to the submitted page number can be supplied to the VBI read-out stage 27.

The VBI read-out stage 27 is adapted to read, upon the occurrence of number information NI, the character code CC and additional information from the VBI lines of the television signal which correspond to the teletext page identified by the number information NI. Read-out character codes CC of the desired teletext page can be stored in the page memory stage 28. Program source information NI, country information CI and character sub-set information ICSI read from the VBI lines as additional information can be supplied to a detection stage 29 of the detection means 20.

Program position information PPI and control information SI received from the keyboard 10 can also be supplied to the detection stage 29. The keyboard 10 can further supply language identification information SKI, which can be entered manually by the user, and user information BI, which can be entered manually by the user, to the detection stage 29, which will be described more fully hereinafter.

Figure 2:
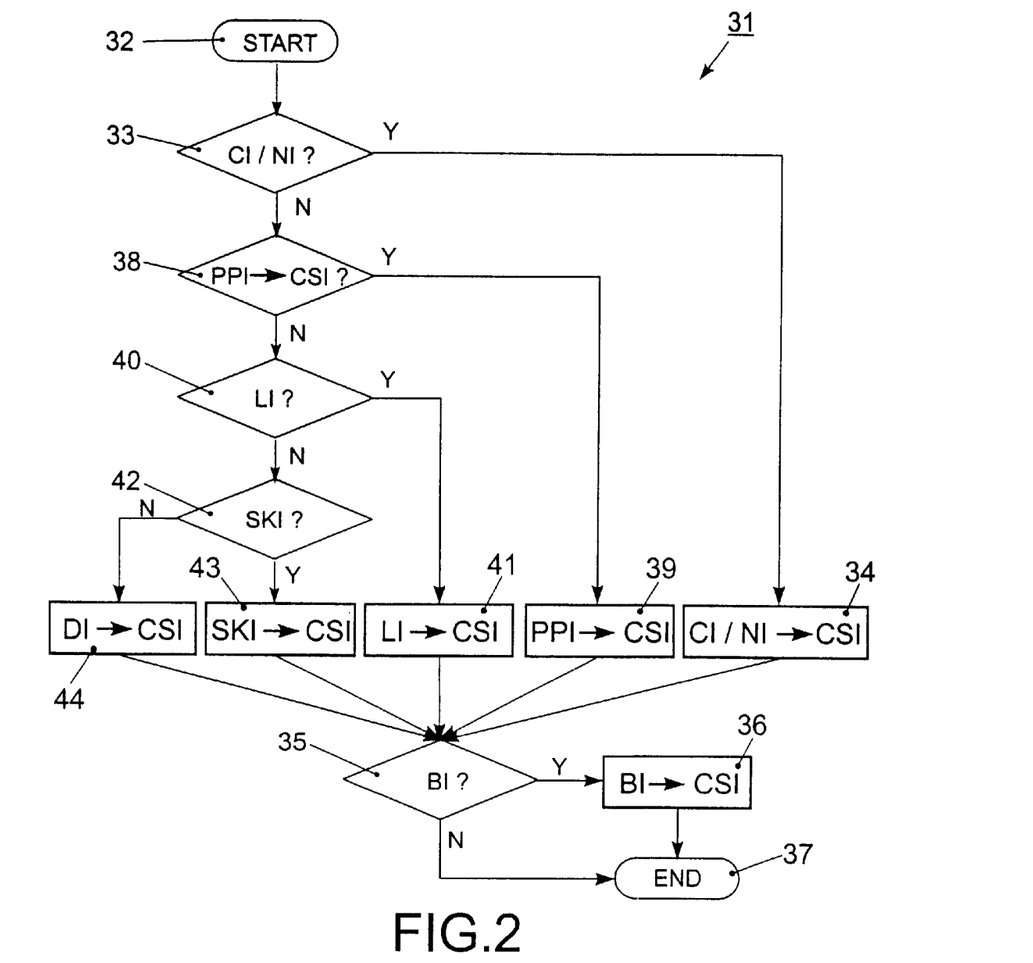
FIG. 2 is a flow chart of a program sequence performed in a detection stage of the receiving device.

The detection means 20 further include a table storage stage 30 adapted to store the correlation table 18 shown in FIG. 3. The detection stage 29 of the detection means 20 is adapted to detect the information applied to it and to supply character set information CSI which identifies the character set to be used for decoding the read-out character code CC. The detection stage 29 is further adapted to supply character sub-set information UCSI which identifies the character sub-set of a character set, which character sub-set is to be used for decoding the read-out character code CC. The detection stage 29 then performs a program sequence whose flow chart 31 is shown in FIG. 2. This will be elucidated hereinafter by means of four examples of use.

Character set information CSI and character sub-set information UCSI detected by the detection means 29 can be applied to the display signal generating means 21. The display signal generating means 21 are adapted to read out character codes CC stored in the page memory stage 29 and to decode said character codes CC with the aid of character set and character sub-set stored in the character set storage means and identified by the character set information CSI and the character sub-set information UCSI. The display signal generating means 21 are further adapted to generate and supply a display signal AS to the superposition stage 16, which display signal AS contains reproducible character information CHI of the teletext page selected by the user.

The operation of the receiving device 17 of the combination apparatus 1 will now be elucidated with the aid of a first example of use. For the first example of use it is assumed that the user has entered the program position information PPI="01" with the keyboard 10 and subsequently the television signal FS from the television station FA="ORF1" is supplied to the VBI read-out stage 27 and the signal processing means 15 as the second television signal FS2. The second television signal FS2 is processed by the signal processing means 15 and is applied to the monitor means 2 via the superposition stage 16 to reproduce the picture information and sound information contained in the television signal.

In the first example of use it is further assumed that the user activates the teletext mode of the combination apparatus 1 by the actuation of a key of the keyboard 10. This activates the program sequence in the detection stage 29 at the block 32 of the flow chart 31 shown in FIG. 2. In a following block 33 the detection stage 29 checks whether the VBI read-out stage 27 has read program source information NI and/or country information CI from additional information of the second television signal FS2 and applied this information to the detection stage 29. The detection stage 29 then detects that program source information NI="AC1" has been read from VPS information of the second television signal FS2, upon which the program sequence proceeds in the block 34.

Advantageously, any program source information NI and any country information CI of a television signal FS is stored in correlation with character set information in the correlation table 18 of the table storage stage 30. This has the advantage that the receiving device 17 can determine the appropriate character set for the decoding of character codes CC contained in the teletext information of the received television signal and that the character codes CC are always decoded with the correct character set.

Now, in a block 34, the character set information CSI="1", which identifies the first character set for the Central European region, is read from the correlation table 18 in the table storage stage 30. In a block 35, which follows the block 34, it is checked whether the user has entered user information BI by means of the keyboard 10. By the entry of user information BI the user has the possibility of defining another character set than that determined automatically by the receiving means 17 as the appropriate character set. User information BI can also be entered into the correlation table 18 and stored in the table storage stage 30 as program position information PPI, as language identification information SKI, which can be entered manually, or as country information LI, which can be entered manually. When the user has entered user information BI, corresponding character set information CSI is derived from the user information BI in a block 36 and the program sequence of the flow chart 31 is terminated in a block 37. When the user has not entered any use information BI the program sequence is terminated immediately after the block 35 in the block 37. Finally, in the block 37, the detected character set information CSI is supplied to the display signal generating means 21.

This yields the advantage that the receiving means automatically determine the appropriate character set for the decoding of the character codes CC from additional information transmitted in VBI lines and read this character from the character set storage means 22 in order to generate a display signal AS. Advantageously, the receiving means also support the above method of determining the appropriate character sub-set by detection of the control bits.

However, it is particularly advantageous that program source information NI and country information CI contained in VPS information and packet 8/30 information are detected and, consequently, no additional information must be transmitted in VBI lines.

In a second example of the use of the combination apparatus 1 the user enters program position information PPI="03", upon which the tuner 9 supplies a corresponding second television signal FS2 to the signal processing means 15 and to the VBI read-out stage 27. Subsequently, the user actuates a key of the keyboard 10 in order to activate the teletext mode of the combination apparatus 1. In response thereto the program sequence in the detection stage 29 is started in the block. 32 of the flow chart 31.

In the block 33, which follows the block 32, the detection stage 29 detects that neither program source information NI nor country information CI has been retrieved from the second television signal FS applied to the VBI read-out stage 27 and has been supplied to the detection stage 29. Subsequently, the program sequence of the flow chart 31 is continued in a block 38.

In the block 38 the detection stage 29 checks whether the correlation table 18 stored in the table storage stage 30 contains character set information CSI for the program position information PPI="03". Such character set information CSI allocated to the program position information PPI in the correlation table 18 can be entered into the correlation table 18 via user information BI or via another set-up process, for example from an information page of teletext information of a television signal.

In the block 38 the detection stage 29 detects that the character set information CSI="3/1" has been allocated to the program position information PPI="3", which character set information identifies the third character set for the region around Russia as the appropriate character set and the first character set of the Central European regions as the twisted character set. Subsequently, the program sequence of the flow chart proceeds in a block 39.

In the block 39 the character set information CSI="3/1" is read out the table storage stage 30. In the block 35, which comes after the block 39, it is found that no user information BI has been supplied to the detection stage 29, as a result of which the program sequence is terminated by supplying the character set information CSI="3/1" to the display signal generating means 21 in the block 37.

This yields the advantage that also in the absence of program source information NI and country information CI in the retrieved additional information the receiving means 17 can automatically determine the character set suitable for the decoding of character codes CC. In addition, the advantage is obtained that the character set information CSI also identifies a twisted character set.

In a third example of the use of the combination apparatus 1 it is assumed that the user has entered program position information PPI="04" by means of the keyboard 10, upon which the tuner 9 supplies a corresponding second television signal FS2 to the signal processing means 15 and the VBI read-out stage 27. It is further assumed that the user activates the teletext mode of the combination apparatus 1. Subsequently, the detection stage 29 starts the program sequence in the block 32 of the flow chart 31.

In the block 33 of the flow chart 31, which comes after the block 32, the detection stage 29 detects that neither program source information NI nor country information CI has been retrieved from additional information of the teletext information of the second television signal FS2 by the VBI read-out stage 27 and has been supplied to the detection stage 29. Subsequently, the program sequence is continued in a block 38.

In the block 38 the detection stage 29 detects that the correlation table 18 contains the character set information CSI="0" for the program position information PPI="04", which indicates that the user has not yet entered any character set information CSI, which identifies a suitable character set, for this program position. Subsequently, the program sequence is continued in a block 40.

In the block 40 it is checked whether country information LI has been entered manually by the user with the aid of the keyboard 10 and has been loaded into the correlation table 18 of the table storage stage 30. In the third example of the use-of the combination apparatus 1 it has been assumed that the user has entered the country information LI="AT" in the correlation table 18 to indicate that the combination apparatus 1 is in use in Austria. When country information LI is available the program sequence of the flow chart 31 is continued in a block 41.

In the block 41 the character set information CSI corresponding to the country information LI="AT" is read from the correlation table 18. The character set information CSI="1" is then read from the table storage stage 30, which character set information identifies the first character set of the Central European region as the appropriate character set. During the block 35, which comes after the block 41, the program sequence proceeds from the block 35 to the block 37 in the absence of user information BI. In the block 37 the character set information CSI="1" is supplied to the display signal generating means 21 and subsequently the program sequence is terminated.

This has the advantage that also in the absence of program source information NI or country information CI in the retrieved additional information it is possible to determine the appropriate character set for the decoding of character codes CC contained in teletext information of the television signal with the aid of country information LI loaded into the correlation table 18. Since manually entered country information LI identifies the country in which the combination apparatus 1 is used character set information CSI allocated to this country information LI in the correlation table 18 identifies the character set of the region in which this country lies. Thus, character codes CC of television signals from neighboring countries near this country can also be decoded successfully.

In a fourth example of the combination apparatus 1 the user enters the program position information PPI="04", as in the third example of use, but the present example no country information LI has been stored in the table storage means 30, in contrast with correlation table 18 shown in FIG. 18. Accordingly, it is therefore ascertained in block 40, after the blocks 32, 33 and 38 have been carried out, that the correlation table 18 does not contain country information LI, and the program sequence proceeds in a block 42.

In the block 42 it is checked whether language identification information SKI has been entered manually by the user and has been loaded into the correlation table 18 of the table storage stage 30. In the fourth example of the use of the combination apparatus 1 it is assumed that the user has entered the language identification information SKI="DE" into the correlation table 18 in order to specify that the combination apparatus 1 is used in a country where the German language is spoken. When language identification information SKI is available the program sequence of the flow chart 31 is continued in a block 31.

In the block 43 the character set information CSI corresponding to the language identification information SKI="DE" is read from the correlation table 18. The character set information CSI="1" is then read from the table storage stage 30, which identifies the first character set of the Central European region as a suitable character set. During the processing of the block 35, which follows the block 43, the program sequence proceeds from the block 35 to the block 37 in the absence of user information BI. In the block 37 the character set information CSI="1" is supplied to the display signal generating means 21 and subsequently the program sequence is terminated.

This has the advantage that also in the absence of program source information NI and country information CI in the retrieved additional information the appropriate character set can be determined by a detection of manually entered language identification information SKI. Since manually entered language identification information SKI identifies the language of the country in which the combination apparatus 1 is used, character set information CSI allocated to said language identification information SKI in the correlation table 18 identifies the region in which this country is situated. Consequently, character codes CC of television signals from neighboring countries in which the same language is spoken as in said country can also be decoded successfully.

In a fifth example of the use of the combination apparatus 1 the VBI read-out stage 27 supplies neither program source information NI nor country information CI to the detection stage 29 and the user has not manually entered program position information PPI, country information LI or language identification information SKI. Moreover, no country information LI or language identification information SKI has been stored in the table storage means 30. Upon completion of the blocks 32, 33, 38, 40 and 42 the program sequence of the flow chart 31 is continued in a block 44.

In the block 44 the detection stage 29 supplies default information DI="1" to the display signal generating means 21 as character set information CSI. The default information DI refers to the character set suitable for most character codes CC that can be received by the receiving means 17.

This has the advantage that a suitable character set is defined for most situations even in the absence of any additional information and information entered by the user.

It is to be noted that it is advantageous to realize the receiving means as an integrated circuit in order to minimize production costs in the case of large-scale production.

It is to be noted that a receiving device in accordance with the invention may also be accommodated on a computer plug-in board for the reception of teletext information. It is to be noted that television signals from television stations in different regions may also be received via a cable transmission system and may be applied to the first input terminal 4 of the combination apparatus 1.

It is to be noted that the program sequence in accordance with the flow chart 31 may also be carried out periodically when the combination apparatus 1 has been set to the teletext mode. This makes it possible to define a suitable character set by means of the detection means 20 when, for example, the satellite receiver 8 supplies another reception signal while the combination apparatus 1 is in the teletext mode.

What is claimed is:

1. A receiving device (17) for receiving a television signal (FS2, FS3) which contains character codes (CC) and additional information (CI, NI, UCSI) in VBI lines, having character set storage (22) for the storage of character codes (CC) and associated reproducible character information (CHI) of a character set and a plurality of character sub-sets and having VBI read-out means (27) for reading out character codes (CC) and additional information (CI, NI, UCSI) contained in VBI lines of a received television signal (FS2, FS3), and having detection means (20) for the detection of character sub-set information (UCSI) contained in read-out additional information (CI, NI, UCSI), which character sub-set information identifies the character sub-set to be used for the decoding of read-out character codes (CC), and having display signal generating means (21) adapted to generate a display signal (AS) which contains reproducible character information (CHI), taking into account received character sub-set information (UCSI), characterized in that the character set storage means (22) are adapted to store character codes (CC) and associated reproducible character information (CHI) of at least two character sets and a plurality of character sub-sets of each character set, and the detection means (20) are, in addition, adapted to detect program source information (NI) or country information (CI) contained in read-out additional information (CI, NI, UCSI) and to supply character set information (CSI) which identifies the character set to be used for the decoding of read-out character codes (CC).

2. A receiving device (17) as claimed in claim 1, characterized in that the detection means (20) include a table storage stage (30) which enables the storage of a correlation table (18) which contains program source information (NI) and associated character set information (CSI) or country information (CI) and associated character set information (CSI).

3. A receiving device (17) as claimed in claim 2, characterized in that the detection means (20) are adapted to detect country information (CI) which can be entered manually and which can be stored in the table storage stage (30) in the absence of program source information (NI) and country information (CI) in the read-out additional information (CI, NI, UCSI).

4. A receiving device (17) as claimed in claim 2, characterized in that the detection means (20) are adapted to detect language identification information (SKI) which can be entered manually and which can be stored in the table storage stage (30) in the absence of program source information (NI) and country information (CI) in the read-out additional information (CI, NI, UCSI).

5. A receiving device (17) as claimed in claim 1, characterized in that the VBI read-out means are adapted to read out VPS information (ETS 300 231) or packet 8/30 information (ETS 300 231) of a received television signal (FS2, FS3) in order to detect the program source information (NI) or country information (CI) of the received television signal (FS2, FS3).

6. A receiving device (17) as claimed in claim 1, characterized in that a twisted character set for at least one of the at least two character sets can be stored in the character set storage means (22).

7. A receiving device (17) as claimed in claim 1, characterized in that the receiving device (17) has been incorporated in an integrated circuit.

8. A recording device (1) having recording means (3) for recording a first television signal (FS1) containing a display signal (AS), characterized in that it includes a receiving device (17) as claimed in claim 1.

9. A television set (1) having monitor means (2) for the display of picture information of a display signal (AS) contained in a first television signal (FS1), characterized in that it includes a receiving device (17) as claimed in claim 1.

10. A receiving device for receiving a television signal which contains character codes in VBI lines, comprising:

character set storage means is adapted for storing at least two character sets each suitable for decoding character codes of a television signal from one region into associated reproducible character information;

VBI read-out means for reading out received character codes contained in VBI lines of a received television signal;

detection means for determining character set information which identifies one of the character sets to be used for decoding the received character codes; and display signal generating means for generating a display signal which contains reproducible character information decoded from the received character codes with said one of the character sets identified by the character set information determined by the detection means.

11. A receiving device as claimed in claim 10, characterized in that said television signal further contains additional information in the VBI lines, and said VBI read-out means is adapted to read out the additional information.

12. A receiving device as claimed in claim 11 characterized in that said additional information comprises program source information or country information.

13. A receiving device as claimed in claim 12, characterized in that said detection means is adapted to detect the program source information or the country information read-out by the VBI read-out means, and to determine the character set information by the detected program source information or the country information.

14. A receiving device as claimed in claim 13, characterized in that said detection means include a table storage stage for storing a correlation table which contains program source information and associated character set information or country information and associated character set information.

15. A receiving device as claimed in claim 13, characterized in that said detection means is adapted to detect, in the absence of the program source information and the country information in the VBI lines, information manually entered by a user and to determine the character set information by the information manually entered.

16. A receiving device as claimed in claim 15, characterized in that the information manually entered by the user is country information or language identification information.

17. A receiving device as claimed in claim 10, characterized in that said detection means is adapted to detect user information manually entered by a user and to determine the character information set by the user information.

18. A receiving device as claimed in claim 10, characterized in that said character set storage means is further adapted for storing a plurality of character sub-sets of each of said character sets, each of character sub-sets being suitable for decoding character codes of a television signal from a specific country in the region associated with said each character set.

19. A receiving device as claimed in claim 18, characterized in that said additional information comprises character sub-set information which identifies a character sub-set to be used for decoding of the received character codes.

20. A receiving device as claimed in claim 19, characterized in that said detection means is adapted to detect the character sub-set information read-out by the VBI read-out means, and said detected character sub-set information is taken into account by said display signal generating means in generating said display signal.

* * * * *